United States Patent

Newman et al.

[15] 3,679,295
[45] July 25, 1972

[54] AUTOMATIC ELECTRONIC READING PATTERN ANALYZER

[72] Inventors: Joel S. Newman, Framingham; Marvin E. Jernigan, Boston, both of Mass.

[73] Assignee: Biometrics, Inc., Cambridge, Mass.

[22] Filed: April 29, 1971

[21] Appl. No.: 138,595

[52] U.S. Cl.....................................351/6, 250/209, 351/7, 351/39
[51] Int. Cl. ........................................A61b 3/10
[58] Field of Search.............................351/6, 7, 39; 250/209

[56] References Cited

UNITED STATES PATENTS 3,450,466  6/1969  Streisinger..................................351/7

*Primary Examiner*—David Schonberg
*Assistant Examiner*—Paul A. Sacher
*Attorney*—Wolf, Greenfield, Hieken & Sacks

[57] ABSTRACT

A subject's eye movement, while reading, is monitored by a photoelectric sensing device. The input from the photoelectric sensor comprises a signal, the amplitude of which is a direct function of the position of the subject's eye. The differences in successively sampled signals are compared to provide an indication of the character of each eye movement, such as normal advancements, fixations, regressions and return sweeps, which are the primary characteristic eye motions during reading. The invention employs means for analyzing automatically and electronically, the outputs from the photosensors and means for directly and immediately presenting the analyzed data in readable alpha-numeric form.

13 Claims, 6 Drawing Figures

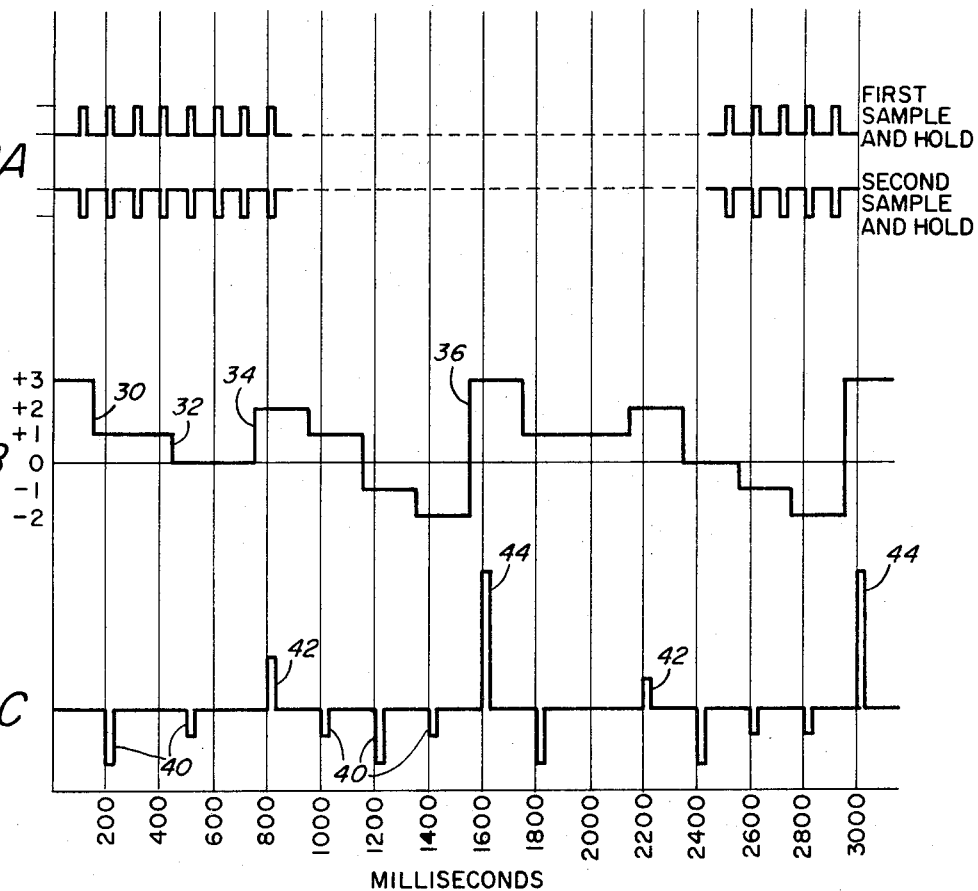

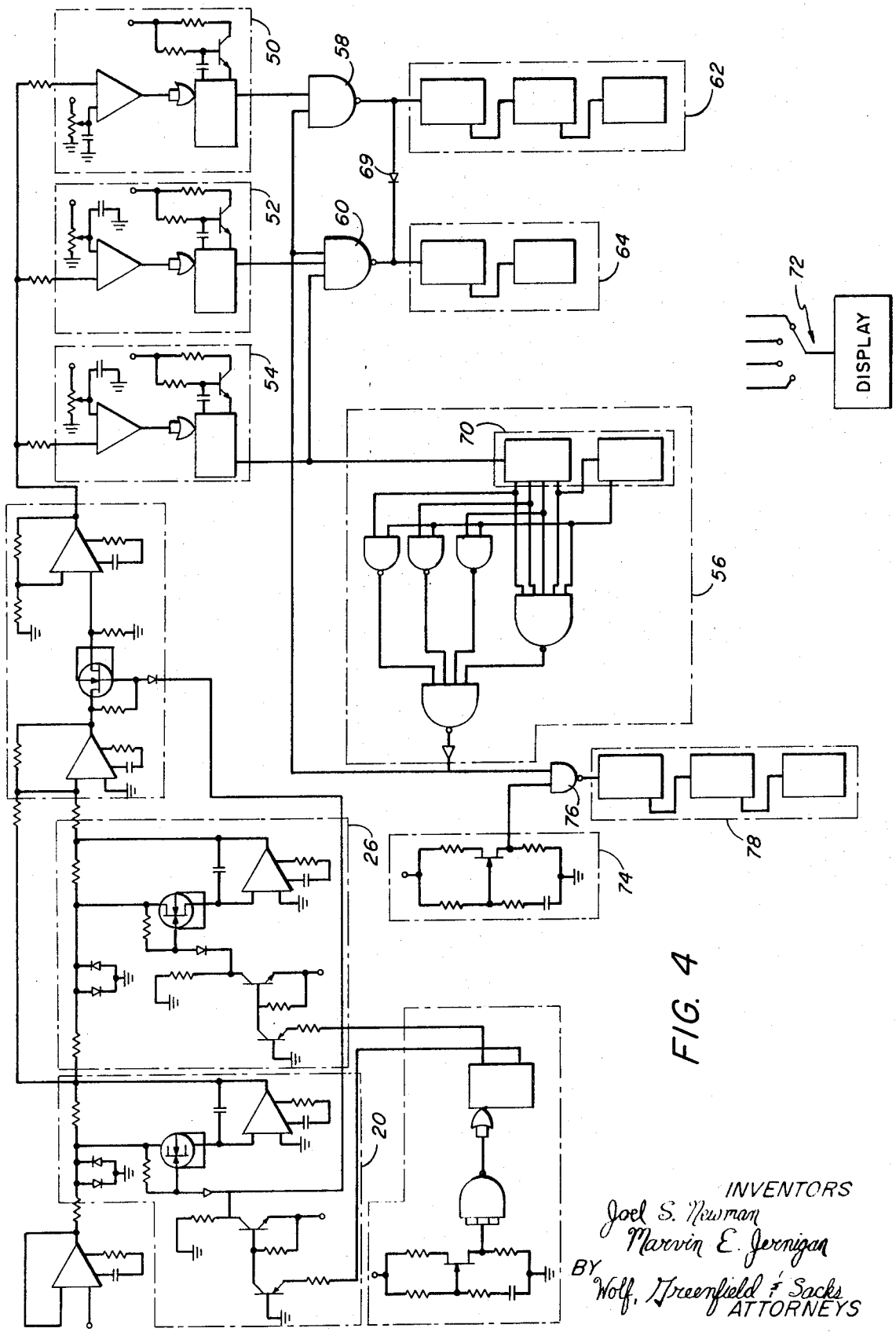

AUTOMATIC ELECTRONIC READING PATTERN ANALYZER

BACKGROUND OF THE INVENTION

This invention relates to improved techniques for analyzing a reader's eye movements to test his reading performance, rate, pacing and efficiency. The particular characteristics of the subject's eye movements which generally are analyzed for these purposes are the normal incremental advances, regressions, return sweeps, fixations and the duration of the fixations. In order to record and analyze these eye movements, the traditional technique has been to employ photographic eye movement recording devices. These photographic techniques generally provide a chart which portrays, graphically, the sequence and character of the subject's eye movements during the test. In order to measure the magnitude of the eye movements as well as their frequency, the photographic record must be inspected and analyzed manually to count the number of fixations, regressions, etc. Additionally, the running time of a particular reading test selection is measured manually. Finally, when employing the photographic recording technique, the photographic film first must be processed. In general, the photographic method is quite cumbersome and time consuming. Moreover, when tests are to be conducted on a large scale, for example as with an entire elementary school class, the time required for data reduction and analysis can be prohibitive.

More recently, photoelectric techniques have been developed for measuring and recording various eye movements. These photoelectric techniques have the advantage of permitting an immediate graphic presentation, as on a strip chart, to the examiner of the eye movement recording. The photoelectric techniques avoid the requirement of film processing and its attendant postponement of the analysis of the recording. Even with the conventional photoelectric techniques, however, the analysis of the eye movement record still must be made manually.

It is among the primary object of the invention to eliminate, or at least reduce materially, the tedious manual analysis of the eye movement recording.

SUMMARY OF THE INVENTION

Recently developed photoelectric eye movement measurement techniques lend themselves particularly to automatic electronic analysis of the characteristic eye movements. For example, U.S. Pat. No. 3,473,868 shows a photoelectric sensing device which monitors, photoelectrically, the subject's eye movements and transforms the eye movements to distinguishable electronic output signals.

The analyzing circuit of this invention includes a pair of sample and hold circuits which receive and sample the signals generated by the photoelectric sensors. The first sample and hold circuit performs the initial sampling of the output signal from the sensors. The second sample and hold circuit thereafter samples the signal level held in the first sample and hold circuit and maintains that level while the next sequential sample from the photosensors is fed into the first sample and hold circuit. As a subsequent signal is fed into the first sample and hold circuit, that same subsequent signal is compared, by a comparator circuit, to the preceding signal level held in the second sample and hold circuit. Sampling and comparison occurs at intervals (100 milli sec.) and for a sample duration (30 milli sec.) sufficient to ensure acquisitions of all fixations while minimizing the effects of noise such as blinks.

The output of the comparator circuit is a pulse, the magnitude and polarity of which corresponds to the difference in signal levels of successively sampled outputs from the photoelectric transducer which difference, in turn, depends on the type of eye movement which has occurred. During the course of a reading exercise, therefore, a train of characteristic pulses is emitted from the comparator. These pulses are fed into three signal level detectors, each of which is triggered by a comparator pulse corresponding to different characteristic eye movements. Each level detector includes a monostable multivibrator which produces a 100 millisecond pulse when a comparator output pulse crosses the preset amplitude threshold of that detector. This is effective to render the level detector insensitive to any new inputs for 100 milliseconds which, as will appear, prevents the generation of extraneous output pulses which might arise from blinks or other input noise.

Means also are provided for disabling the entire analyzer circuit while the subject is reading the first and last lines of the test card. These lines ordinarily are atypical and thus preferably are excluded from the test data.

The number of output pulses from each level detector may be stored in appropriate registers and may be displayed to the operator in alphanumeric notation.

It is among the primary objects of the invention to provide an arrangement for automatically and immediately interpreting the generally complex reading patterns evidenced by eye movements during reading.

Another object of the invention is to provide an improved technique for eliminating the heretofor tedious manual analysis of graphically reading test records.

Another object of the invention is to provide an apparatus which enables a reading test to be administered by a relatively unskilled examiner.

Another object of the invention is to provide an electronic reading pattern analyzer which is suitable for use in mass testing environments such as in schools and the like.

DESCRIPTION OF THE DRAWINGS

These and other objects and advantages of the invention will be understood more fully from the following detailed description thereof, with references to the accompanying drawings wherein:

FIG. 1 is an illustration of a typical strip chart recording of a subject's eye movement during a reading test;

FIGS. 2A, 2B, and 2C illustrate respectively, the timing sequence of sampling the output from the photosensors, the amplitude of the signals generated by the photosensors and the output pulses generated by the comparator circuit;

FIG. 4 is a more detailed schematic diagram of the analyzer circuit.

DESCRIPTION OF THE PREFERRED EMBODIMENT

Figure 3:
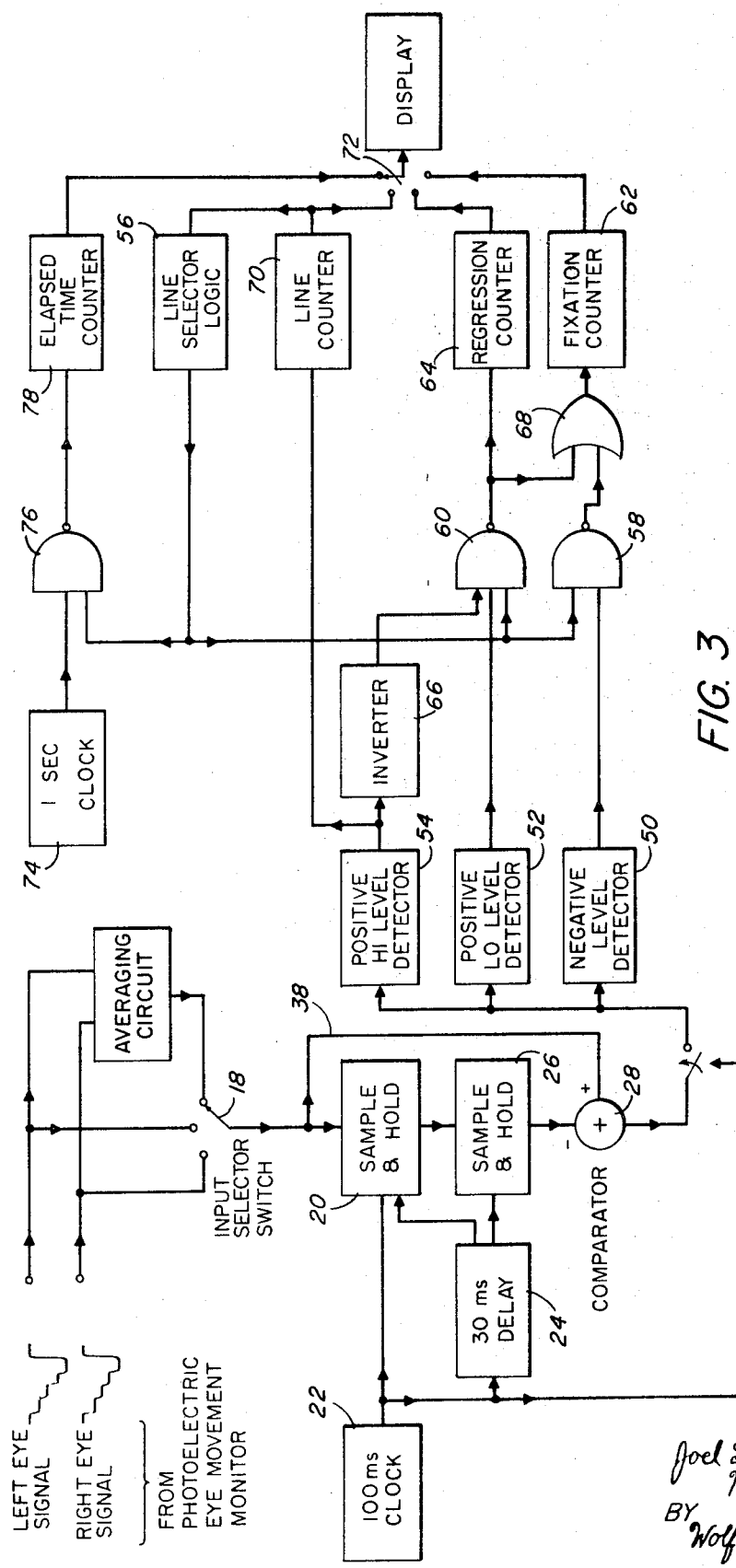
FIG. 3 is a block diagram analyzer circuit.

FIG. 1 shows a representative strip chart recording of the subject's eye movements during a typical reading test. These eye movements characteristically comprise normal incremental advancements 10 as the subject reads from left to right; fixations 12 during which time the subject's eye is stationary; regressions 14 as the subject's eye retrace and reread a portion of a line; and return sweeps 16 when the subject completes one line and then shifts his view to the beginning of the next succeeding line. Strip charts of the type shown may be obtained by employing the device described in the aforementioned U.S. Patent. The pattern charted on the strip chart is a direct function of the output from the photoelectric sensing device, described in that patent, which monitors the subject's eye movement. In order to analyze the reader's ability, the strip charts must be examined carefully to count manually the number of fixations, regressions, return sweeps and normal advancements. As mentioned above, this is quite tedious and does not lend itself to mass use, as when testing in schools and the like.

The invention relates to a method and apparatus for analyzing automatically and immediately, the subject's eye movements which may be presented to the examiner directly and immediately and in tabulated alphanumerical form. As shown in FIG. 3, the output signals produced by the movement of each eye are fed into the analyzer circuit. The input portion of the circuit includes an input selector switch 18 which enables the operator to select the signal from either eye or an average of the signals resulting from both eyes. The signal at the input selector switch 18 is directed to a first sample and hold circuit 20 which is driven by an oscillator clock 22 to perform an initial sampling of the signal from the photoelectric sensors. The oscillator clock 22 is designed so that the first sample and hold 20 samples the input signals at 100 millisecond intervals with a sampling duration of approximately 30 milliseconds. This insures acquisition of all fixations, which typically are approximately 200 milliseconds or longer in duration and yet minimizes the effects of noise and other unwanted signals, such as blinks, which typically are approximately 30 milliseconds in duration. Termination of the sampling is controlled by a delay circuit 24 which switches the first sample and hold circuit 20 to an "off" state. In order to retain the signal level in the first sample and hold circuit 20 for comparison with a subsequently sampled signal, the delay circuit 24 also drives a second sample and hold circuit 26 which then, in turn, samples the signal level held in the first sample and hold circuit 20.

Successive input signals are compared in a comparator circuit 28 which receives the signals from second sample and hold circuit 26 and the next succeeding signal from the photoelectric sensors. The output of the comparator is controlled by a switch which is driven by the oscillator clock 22. For any given pair of successive input signals, the output of the comparator is a pulse, the magnitude and polarity of which depends on the difference between the two successive signal levels. Thus, during the course of a reading exercise, a train of characteristic pulses, as shown in FIG. 2C, is produced by the comparator 28. The magnitude and polarity of the pulses indicate the characteristic eye movement in question, and the output from the comparator 28 is fed into three level detectors 50, 52, 54 and associated logic circuitry to analyze the train of output pulses from the comparator and to transform them into directly readable and usable information for the examiner.

FIGS. 2B and 2C show, respectively, the successive signal levels from the photoelectric sensors and the resulting pulse output pattern from the comparator, both as a function of real time. Each different signal level, shown in FIG. 2B, is representative of a fixation of the subject's eyes. As the subject's eyes move, incrementally, from fixation to fixation, any fixation will result in a change in the amplitude of the signal from the photosensor. The polarity of the change provides an indication of whether the subject's eye movement had been an advancement along the reading direction or a reversed motion, such as a regression or a return sweep. As shown, illustratively in FIG. 2B, more negative successive signals levels indicate incremental advancement of the subject's eyes whereas signal level changes in a positive direction represent regression or retracing movement of the subject's eyes (right to left). The magnitude of the change in successive signal levels is indicative of the extent of the particular eye movement. For example, a change in the input signal to the analyzed circuit from +3 to +1 volts, as suggested at 30, indicates a larger eye movement in an advancing direction than the next succeeding change 32 in signal level from +1 to zero volts. Similarly, the regression 34, indicated in FIG. 2B by an increase in signal level from zero to +2 volts represent a normal regression in which the subject's eye movement is considerably less than in the return sweep, which is indicated at 36 by an increase in the signal level from −2 to +3 volts.

As described herein, the first sample and hold circuit 20 is driven at 100 millisecond intervals, as shown in FIG. 2A, to sample the signal level from the photoelectric sensors. Simultaneously with this sampling, the comparator circuit 28 is triggered to sense the voltage level of the sampled pulsed through the line 38 and compare it with the voltage level of the previously sampled pulse, which signal has been stored in the second sample and hold circuit 26. Thus, in a normal advancing eye movement in which the voltage level of the photoelectric sensor signal decreases, the comparator 28 will produce a negative output pulse 40 of an amplitude corresponding to the decrease in signal level voltage of the compared signals.

Similarly, in the case of a regression, the increase in voltage of successive signal levels will result in a positive output pulse 42 from the comparator of an amplitude corresponding to the extent of the regressive eye movement. Return sweep movements similarly result in a positive output pulse 44 from the comparator 28 but, because the eye movement in the return sweep is considerably greater than that in a normal regression, the amplitude of the positive output pulse 44 from the comparator is considerably greater than that resulting from a normal regression. Thus, each output pulse from the comparator represents a fixation; each negative comparator pulse represents a normal incremental advancement; each low level positive output comparator pulse represents a regression; and each high level positive output pulse from the comparator represents a return sweep.

In order to distinguish between and tabulate the sum of the three characteristic comparator pulses, the analyzer circuit includes amplitude threshhold detection devices 50, 52, 54 which are responsive to the amplitude and polarity of the comparator output pulses. Each of the threshhold detectors produces a pulse in response to crossing of the preset threshhold level by the comparator output pulse to generate its own pulse. The pulses from each of the three level detectors 50, 52, 54 are directed through logic circuitry which includes storage registers to count the number of particular characteristic eye movements so that the number of such movements may be presented to the examiner immediately in alphanumeric form.

In particular, and as shown in the schematic diagram of FIGS. 3 and 4, the detection devices comprise a negative level detector 50, a positive low level detector 52 and a positive high level detector 54. Each of these detectors includes a monostable multivibrator which, when set by crossing of its amplitude threshhold by the input signal, produces an output pulse of 100 milliseconds duration. This insures that the detector cannot be activated by any extraneous noise or external signals during this interval. Each of the threshhold detectors also includes a calibration circuit to permit the amplitude threshhold actuation level to be adjusted to the desired voltage. Thus, the detectors 50, 52, 54 are adjusted to be triggered in response to progressively increased voltage levels.

Ordinary reading tests of the type with which the invention generally is employed comprise a paragraph of, for example, 12 lines, in which the first and twelfth lines are atypical in that they are of shorter length than the intermediate second through eleventh lines. It is desirable, therefore, to conduct the test only during the subject's reading of the full-length second through eleventh lines. For this purpose, the invention includes means for disabling the analyzing circuit until the first atypical line of the test has been read and for thereafter actuating the circuitry to perform its selection and counting function. Means also are provided for counting the number of return sweeps so as to again disable the logic circuitry after the eleventh line has been completed thus excluding the last, atypical line of the reading sample from the test data. As shown in FIG. 3 the logic enabling-disabling function is controlled by a line selector logic circuit 56 which is controlled by the output from the positive high level detector 54 (return sweep detector). The output from the line selector logic circuit 56 is applied to one of the inputs of each of a pair of enabling nand gates 58, 60 which control actuation of the fixation counter 62 and regression counter 64 from the pulses generated by the negative level detector 50 and positive low level detector 52 respectively. Thus, before the subject begins reading the test card, a "zero" output from the line selector logic circuit 56 is applied to one of the terminals of both gates 58, 60. This maintains the output of the gates at a "high" or " 1" state. The counters 62, 64, however, are arranged to register a count when the output from their respective gates 58, 60 drops to a "low" or "0" level. After the first line has been read and the first high level positive output from the comparator 28 triggers the return sweep threshhold detector 54, the output from the line selector logic circuit 56 is applied to the respective terminals of the gates 58, 60 to enable those gates and allow subsequent output pulses from the fixation and regression detectors 50, 52 to drive the gates 58, 60. In this regard, it should be noted that each positive high level output pulse from the comparator necessarily includes the positive low level threshhold of the regression detector 52. In order to insure that a return sweep is not counted as a simple regression, the output from the return sweep detector 54 also is directed through an inverter 66, the output of which is applied to one of the other terminals of the gate 60. Thus, when the output from the return sweep detector 54 is "high", a "low" signal will be applied to the terminal of gate 60 thus disabling the gate so that it is insensitive to a "high" output from the regression detector 54.

As the test progresses, the negative output pulses from the comparator will cross the amplitude threshhold level of the negative level detector 50 to trigger its monostable multivibrator from a low to a high output level. This enables the gate 58 so that its output switches to the "low" state. The output from the gate 58 passes through an "or" gate 68 and then to the fixation register 62 which is responsive to a "low" state input. The "or" gate 68 may comprise a diode 69 across the outputs of gates 58, 60. The fixation counter 62, as well as the other counters in the circuit, may comprise any of the variety of well known digital registers such as binary counters employing flip-flop configurations and the like.

When the eye movement comprises a regression, which also counts as a fixation, the output from the regression threshhold detector 52 is applied to one of the terminals of gate 60. Because the positive high level detector 54 is in a "low" state, its inverted output, applied to the gate 60, is at a "high" level. Thus, all of the inputs to gate 60 are "high" and the output, being low, triggers the regression counter. In addition, the output from gate 60 is applied, through the "or" gate 68 to the fixation counter 60 thus advancing the fixation counter to the next digital state.

The number of lines which the subject has read is counted by the line counter 70 which is responsive to a low output from the return sweep threshhold detector 54. The output from the monostable multivibrator of the return sweep detector 54 normally is high and, when activated, switches to a low state to activate the line counter 70 and advance it to the next digital configuration. After eleven return sweep signals have been registered in the line counter, the line selector logic 56 is responsive to the next succeeding output from the line counter 70 to switch the output from the line selector logic to the low state thus disabling gates 58 and 60.

Each of the registers or counters 62, 64, 70 may be "read" by the operator through an output selector switch 72 which connects a conventional alphanumeric display selectively to any of the outputs of the register 62, 64, 70. In addition, the device may include an electronic timer to enable the operator to determine the length of time which it took the subject to complete the test. This arrangement may include a one second clock 74, such as an appropriate oscillator adapted to generate a pulse at one second intervals. The output from the oscillator 74 is applied to a terminal of a nand gate 76 which is enabled by the line selector logic circuit 56 after the first line has been read and is disabled before the last line is read in the same manner as is gates 58 and 60 described below. The output from the gate 76 is applied to a binary counter or register 78 which is responsive to a "low" input as are the other registers. The operator may read the time elapsed by connecting the output selector switch 72 of the display to the output from the lapse time register 78.

Thus, we have described an improved method and apparatus for determining immediately and automatically, a subject's reading pattern. It should be understood, however, that the foregoing description of the invention is intended merely to be illustrative thereof and that other embodiments and modifications will be apparent to those skilled in the art without departing from the spirit.

Having thus described the invention what is claimed is:

1. An apparatus for analyzing the reading pattern of a subject comprising:
   means for monitoring the direction and magnitude of the subject's eye movement;
   circuit means responsive to said monitoring means for producing a pulse of first predetermined characteristics in response to a normal incremental advancement of the subject's eye, a pulse of second predetermined characteristics in response to a regressive movement of the subject's eye, and a pulse of third predetermined characteristics in response to a return sweep movement of the subject's eye;
   pulse detection means associated with said circuit means, said pulse detection means being constructed to selectively detect said characteristic pulses generated by said circuit means, said pulse detection means being constructed to generate an output for driving a digital register to its next successive state;
   at least a portion of said digital register means being connected to said pulse detection means to count the number of said pulses of said first and said second predetermined characteristics, whereby the state of said at least one portion of said digital register means may provide an indication of the number of fixations made by the subject's eye.

2. A reading pattern analyzer as defined in claim 1 wherein said monitoring means comprises means responsive to the position of the subject's eye for generating a signal having an amplitude level which is a direct function of the subject's eye position, said signal generating means being so constructed and arranged so that said incremental advancements effect changes in one direction in the amplitude of said generated signal, said regressions effect changes in the opposite direction in the amplitude of said generated signal and said return sweeps effect changes in said opposite direction in the amplitude of said generated signal, said amplitude changes for said return sweeps being substantially greater than said amplitude changes for the other of said eye movements, said circuit means for producing said pulses of said first, second and third characteristics comprising:
   means for sampling the amplitude of said generated signal at a successive discrete time intervals; and
   comparison circuit means for detecting the change in magnitude and direction of the amplitude of successively sampled pulses and for producing one of said first, second and third pulses in response to said change.

3. A reading pattern analyzer as defined in claim 2 wherein said characteristics of said first, second and third pulses correspond, in polarity and amplitude, to the changes in directing and magnitude of successively generated signals by said monitoring means.

4. A reading pattern analyzer as defined in claim 3 wherein said detection means further comprises:
   first amplitude threshhold and sense detector means responsive to said first characteristic pulse;
   second amplitude threshhold and sense detector means responsive to said second characteristic pulse; and
   third amplitude threshhold and sense detector means responsive to said third characteristic pulse.

5. A reading pattern analyzer as defined in claim 4 wherein each of said threshhold and sense detectors is constructed to produce a drive pulse in response to presentation of its responsive signals thereto, said analyzer further comprises:
   a first gate means between said first detector means and its associated first digital register;
   second gate means between said second detector means and its associated second digital register; and
   means connecting the output from each of said gates to said first digital register whereby said first digital register may count the number of eye fixations and whereby the second digital register may count the number of regressive eye movements.

6. A reading pattern analyzer as defined in claim 5 further comprising:
   means responsive to a drive pulse from said third threshhold and sense detector for disabling said second gate means to preclude said third characteristic pulse from driving said second digital register.

7. A reading pattern analyzer as defined in claim 5 further comprising:

second means for disabling said first and second gate means until said third threshhold and sense detector means produces a drive pulse, said circuit means being adapted to thereafter disable said first and second gate means after a selected number of drive pulses have been generated by said third detector means.

8. A reading pattern analyzer as defined in claim 7 further comprising:

oscillator means for generating a real time pulse at selected time intervals;

a digital register adapted to be advanced to successive states corresponding to the number of pulses generated by said oscillator means;

third gate means between said oscillator and said digital register; and means for disabling and enabling said third gate means simultaneously with said first and second gate means to provide a measurement of the duration of the reading test.

9. A reading pattern analyzer as defined in claim 2 wherein said means for sampling said generated signal comprises:

a first sample and hold circuit connected to said signal generating means;

a second sample and hold circuit connected to the output of said first sample and hold circuit;

means connecting the output from said second sample and hold circuit to said comparator circuit;

oscillator means for driving said first sample and hold circuit at predetermined intervals to enable said first sample and hold circuit to sample, for a portion of said predetermined interval, the signal from signal generating means;

means connecting the output of said oscillator means to a delay circuit, the output of said delay circuit being connected to said first sample and hold circuit to terminate the sampling function thereof and also connected to said second sample and hold circuit for actuating said second sample and hold circuit to sample the signal level held in said first sample and hold circuit;

means connecting the input to said first sample and hold circuit to said comparator circuit;

switch means at the output of said comparator circuit; and said oscillator means being connected to said switch means for closing the output of said comparator in phase with initiation of the sampling function of said first sample and hold circuit.

10. A reading pattern analyzer as defined in claim 9 further comprising:

said predetermined intervals being of the order of approximately 100 milliseconds;

said delay circuit means being so constructed and arranged as to reverse the state of said first and second sample and hold circuits for at least 30 milliseconds after the sampling function of said first sample and hold circuit has been initiated; and whereby the sampling function of said first sample and hold circuit is sufficiently frequent to detect all changes in eye position and is of a duration sufficient to avoid unwanted signals as from blinks or the like.

11. A method of automatically analyzing a subject's reading pattern comprising:

monitoring the subject's eye movement during a reading test;

generating a signal having an amplitude corresponding to a change in the position of the subject's monitored eye;

comparing the amplitudes of successively generated signals;

generating a pulse in response to said comparison of said successive signals, said pulse being of a polarity and magnitude corresponding to the change and amplitude of said successively compared signals;

detecting those of said pulses having a first polarity;

detecting those of said pulses having a second polarity and a relatively small amplitude change;

detecting those of said pulses having said second polarity and a relatively large amplitude change; and counting each of said detected pulses in digital registers.

12. A method as defined in claim 11 further comprising:

counting all of said pulses in one of said registers to provide an indication of the number of fixations which the subject's eyes have made during the test.

13. A method as defined in claim 11 in which said reading test includes reading matter having lines, some of said lines being atypical, said method further comprising:

sensing when the subject's eyes have advanced to said atypical lines in said test; and precluding counting of any of said detected pulses while said subject is reading said atypical lines.

* * * * *